(12) United States Patent
Ennesser (10) Patent No.: US 8,819,297 B2
(45) Date of Patent: Aug. 26, 2014

(54) TOKEN FOR COMMUNICATING WITH A HOST DEVICE, CORRESPONDING COMMUNICATION SYSTEM AND METHOD

(75) Inventor: François Ennesser, Paris (FR)

(73) Assignee: Gemalto SA, Meudon (FR)

( * ) Notice: Subject to any disclaimer, the term of this patent is extended or adjusted under 35 U.S.C. 154(b) by 8 days.

(21) Appl. No.: 13/520,112

(22) PCT Filed: Dec. 20, 2010

(86) PCT No.: PCT/EP2010/070301
§ 371 (c)(1),
(2), (4) Date: Oct. 22, 2012

(87) PCT Pub. No.: WO2011/080147
PCT Pub. Date: Jul. 7, 2011

(65) Prior Publication Data
US 2013/0042025 A1    Feb. 14, 2013

(30) Foreign Application Priority Data
Dec. 29, 2009    (EP) .................................... 09306338

(51) Int. Cl.
*G06F 3/00*       (2006.01)
*G06F 13/10*      (2006.01)
*G06F 13/12*      (2006.01)
*H04W 92/08*      (2009.01)

(52) U.S. Cl.
CPC ............ *G06F 13/102* (2013.01); *G06F 13/126* (2013.01); *G06F 2213/0042* (2013.01); *H04W 92/08* (2013.01)
USPC ............................................................. 710/5

(58) Field of Classification Search
CPC ...................................................... G06F 13/126
USPC ............................................................. 710/5
See application file for complete search history.

(56) References Cited

U.S. PATENT DOCUMENTS

| 7,293,122 B1 * | 11/2007 | Schubert et al. ............... 710/62 |
| 2006/0174308 A1 * | 8/2006 | Fuller et al. ................... 725/133 |
| 2006/0285559 A1 * | 12/2006 | Cheng ........................... 370/522 |
| 2007/0228164 A1 * | 10/2007 | Lu et al. ......................... 235/441 |
| 2009/0193511 A1 | 7/2009 | Noe et al. |

OTHER PUBLICATIONS

Universal Serial Bus Specification, Revision 2.0, Apr. 27, 2000, pp. 1, 4, 292.*
Universal Serial Bus Mass Storage Class Specification Overview, Revision 1.3, Sep. 5, 2008, pp. 1-9.*
International Search Report (PCT/ISA/210) issued on Aug. 31, 2011, by the European Patent Office as the International Searching Authority for International Application No. PCT/EP2010/070301.

(Continued)

*Primary Examiner* — Farley Abad
(74) *Attorney, Agent, or Firm* — Buchanan Ingersoll & Rooney PC (57) ABSTRACT

The invention relates to a token for communicating with a host device. The token includes an interface for communicating through at least one USB communication channel. The token is adapted to receive, through at least one USB communication channel, a command for requesting the token to specify at least one capability of the token, and send, through at least one USB communication channel, as a reply to the received command, a response for specifying that the token supports a USB device class for HID. The invention also relates to corresponding communication system and method.

12 Claims, 2 Drawing Sheets (56) References Cited

OTHER PUBLICATIONS

Written Opinion (PCT/ISA/237) issued on Aug. 31, 2011, by the European Patent Office as the International Searching Authority for International Application No. PCT/EP2010/070301.

USB Implementers' Forum: "Device Class Definition for Human Interface Devices (HID)—Firmware Specification—Version 1.11", Jun. 27, 2001, XP002582009.

* cited by examiner

TOKEN FOR COMMUNICATING WITH A HOST DEVICE, CORRESPONDING COMMUNICATION SYSTEM AND METHOD

FIELD OF THE INVENTION

The invention relates, in a general manner, to a token for communicating with a host device.

Within the present description, a token is any portable smart object that is intended to communicate with the outside world, and, in particular, to cooperate with a host device.

Moreover, the invention relates to a communication system comprising a host device and a token.

Finally, the invention relates to a method for communicating between a host device and a token.

The present invention is notably applicable within a mobile radio-telecommunication field wherein a smart card termed Subscriber Identity Module (or SIM) card or the like, as token, cooperates with a mobile telephone, as host device.

STATE OF THE ART

As known per se, once a user has selected, thanks to the mobile telephone keyboard, an application, supported by the SIM card, the SIM card is able to implement a proactive session, i.e. the SIM card is able to issue at least one command(s) intended to the mobile telephone. The proactive session consists in that, instead of the traditional master-slave mechanism in which the mobile telephone plays the master role and the SIM card plays the slave role, the SIM card, as the master, initiates a communication to request an action from the mobile telephone, as the slave, by sending to this latter a so-termed proactive command.

Such a proactive capability of the SIM card is specified within some standard specifications, such as the European Telecommunication Standard Institute (or ETSI) Technical Specifications (or TS) 102 223 version 8.2.0 (2009-01), and known therein as the Card Application Toolkit (or CAT). The CAT enables to execute Application Protocol Data Units (or APDU) applications offered by the SIM card.

To allow to revert the traditional master-slave mechanism so as to execute APDU applications, the mobile telephone regularly polls the SIM card by sending it a dummy command, so as to know whether the SIM card has or not a proactive command to be executed by the mobile telephone.

Moreover, with the continuous evolvement of the SIM card, the SIM card, termed Universal Serial Bus (or USB) SIM card, has a Universal Serial Bus (or USB) communication channel, so as to benefit from data rates greater than one megabit per second for a data exchange between the mobile phone and the USB SIM card.

Furthermore, the USB SIM card supports other applicative layer(s) than APDU applicative layer, so as to access services, for example, through a web server embedded within the USB SIM card. Thus, when an event occurs on this other applicative layer that requires the USB SIM card to send a proactive command, the USB SIM card has to jump to the APDU applicative layer, so as to access a proactive capability.

However, such a solution for accessing a proactive capability offered by the USB SIM card is not efficient since it implies to either duplicate a source code relating to the APDU applicative layer or wait for a polling at the APDU applicative layer.

There is thus a need to provide any applicative layer of a USB SIM card, and, more generally, to a USB token, with a proactive capability that is more efficient.

SUMMARY OF THE INVENTION

The invention proposes a solution for satisfying the just hereinabove specified need by providing a token for communicating with a host device. The token comprises means for communicating through at least one USB communication channel.

According to the invention, the token is adapted to receive, through at least one USB communication channel, a command for requesting the token to specify at least one capability of the token; and send, through at least one USB communication channel, as reply to the received command, a response for specifying that the token supports a USB device class for Human Interface Device (or HID).

The principle of the invention consists in that, when solicited about its capability(ies), a token, that is able to communicate through a USB link, is arranged so that it presents itself as supporting a USB device class for HID before a host device.

As token, it can be any electronic device comprising at least one microprocessor, as data processing means, at least one memory (or being connected to at least one memory), and at least one Input/Output communication interface. The token can constitute any electronic medium, as a USB Secure Removable Module (or SRM). For example, it can be embodied within a USB smart card, a USB smart dongle, a chip to be fixed to a host device, preferably in a removable manner. The token is any electronic medium that may have different form factors.

A man skilled in the art would not have considered that the token presents itself as a USB device class for HID before a host device. As a matter of fact, like its name specifies, the USB device class for HID relates to a device class that encompasses devices which directly interface with a human, i.e. interact with a human, while, as known per se, a token does not interact with a human but only with another device. As known per se, a USB device class definition for HID comprises devices, such as a keyboard, a mouse, a pointing device, or a joystick, that take an input from human and may provide human with an output.

The invention solution makes it possible to avoid any development of a new USB class driver or modification of the existing standard USB class drivers since the host device uses the already existing standard USB HID driver to provide it with a service initiated by the token, as USB HID peripheral.

Furthermore, contrary to the known hereinabove described solution, the invention solution allows to avoid either any duplication of a source code relating to another proactive applicative layer, such as an APDU applicative layer or any waiting for a polling initiated by the host device at an applicative layer. Such an advantage remains true whatever the count of applicative services supported by the token.

According to a further aspect, the invention is a communication system. The communication system comprises a host device and a token. The token and the host device comprise means for respectively communicating with the host device and the token through at least one USB communication channel.

According to the invention, the token is adapted to receive from the host device, through at least one USB communication channel, a command for requesting the token to specify at least one capability of the token; and send to the host device, through at least one USB communication channel, as reply to the received command, a response for specifying that the token supports a USB device class for HID.

The host device interacts with a token, as USB HID peripheral, so as to perform some action(s) requested by the token through a proactive command. Moreover, the host device may reply to the request by sending (to the token) a result relating to the performed action(s) or an attempt for carrying out the requested action(s).

According to a further aspect, the invention is a method for communicating between a host device and a token. The token and the host device comprise means for respectively communicating with the host device and the token through at least one USB communication channel.

According to the invention, the host device sends to the token, through at least one USB communication channel, a command for requesting the token to specify at least one capability of the token. The token sends to the host device, through at least one USB communication channel, as reply to the received command, a response for specifying that the token supports a USB device class for HID.

The use of a USB HID interface allows to make available proactive capabilities to the token at a low level layer that can readily be shared with any high level (applicative) layer, such as an Internet Protocol interface, an APDU interface, a mass storage interface and/or other interface(s). Consequently, there is no respective traffic overhead to be provided.

By using the token as a USB HID peripheral, the token offers a "proactive" capability at a low level. Consequently, the proactive capability is implemented, in an independent manner of the nature of an application that requires the proactive capability, through at least one USB communication channel.

Specific proactive command(s) and corresponding response(s) has(have) to be associated with HID Report Descriptor(s) that describe(s) data that may originate from the token and is intended to the host device. Thus, each HID report may be associated with its corresponding use by the host device, as a proactive function or service initiated by the token.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

A description of the invention that follows is made with a reference to the name of the entities or the messages defined notably by the USB standard specifications version 2.0 or by the USB Device Class Definition for HID standard specifications version 1.11.

Herein under is considered a case in which the invention token is a USB SIM type smart card intended to be coupled to a mobile telephone, as host device.

For example, instead of being constituted by a USB SIM type smart card, the token can be constituted by a USB dongle, a USB smart card, and/or any other electronic medium that may have different form factors. According to still other examples, the token can also be a chip fixed, possibly in a removable manner, to a host device, or an embedded Secure Element, as chip to be soldered within a host device.

Likewise, instead of being constituted by a mobile telephone, the host device can be constituted, for example, by a set-up box, a desktop computer, a laptop computer, a mediaplayer, a game console, a handset and/or a Personal Digital Assistant (or PDA).

However, the invention embodiment described infra is only for exemplifying purposes and is not considered to reduce the scope of the present invention.

Figure 1:
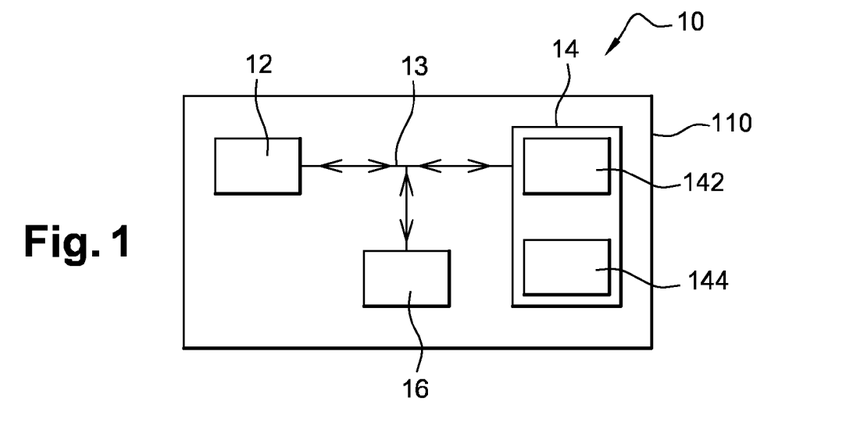
FIG. 1 illustrates a simplified diagram of one embodiment of a USB SIM type smart card, as token, being adapted to present itself and act as a USB HID peripheral before a host device.

FIG. 1 schematically shows functional components incorporated within a chip 110 included within a USB SIM type smart card 10, as token.

Such a token is a device that has computing means with limited performance with respect to a Personal Computer (or PC), such as, in particular a reduced data processing capacity and a restricted memory capacity.

The token does not provide any direct access to a human person contrary to a normal HID since, to access the token, a human person interacts through an host device man machine interface.

The USB SIM type smart card 10 is intended to interact with a mobile telephone, as host device.

For the sake of clarity and conciseness, the mobile telephone and the USB SIM type smart card are termed hereinafter the phone and the USB card respectively.

As USB card 10, it securely stores an International Mobile Subscriber Identity (or IMSI), as a unique number associated with one phone (or handset) user, and a service subscriber key Ki.

The IMSI is used to identify one subscriber in relation with at least one mobile radio-communication network, such as a GSM (acronym for "Global System for Mobile communications"), UMTS (acronym for "Universal Mobile Telecommunication System") and/or CDMA (acronym for Code Division Multiple Access) network(s).

The service subscriber key Ki is freed and used only when the phone user has been authenticated by the USB card (once she or he has given data as her or his Personal Identity Number (or PIN) that is checked by the USB card). The service subscriber key Ki is used to authenticate the subscriber for benefiting from a service provided through the mobile radio-communication network(s).

The USB card 10 can be, for example, a USB SIM smart card for a GSM network, a Removable User Identity Module (or RUIM), or a Universal Integrated Circuit Card (or UICC) as defined in ETSI TS 102 221 that contains a Network Access Application, such as a Universal Subscriber Identity Module (or USIM) for a UMTS network, a CDMA Subscriber Identity module (or CSIM) for a CDMA network, and/or an Internet Protocol multimedia Services Identity Module (or ISIM) for IP Multimedia Subsystem (or IMS).

Naturally, the just aforementioned list is not exhaustive but only for exemplifying purposes and is not considered to reduce the scope of the present invention.

A chip 110 of the USB card 10 comprises, as data processing means, at least one microprocessor 12, volatile and non volatile memories 14, and at least one Input/Output (or I/O) interface 16 linked all together through a data and control internal bus 13.

The I/O interface 16 is used to receive data from or send data to outside of the chip 110, namely with at least one phone, as host device, through a corresponding phone I/O interface.

The I/O interface 16 comprises at least one USB communication channel, as physical link, in compliance with the USB standard specifications.

The USB communication channel(s) include(s) one USB control pipe "0" (zero), as USB default pipe, one USB control pipe, one USB Interrupt IN pipe, one or several USB bulk transfer pipes, and/or one USB Interrupt OUT pipe, as logical link(s).

Furthermore, the I/O interface 16 may comprise another or other communication channel(s), such as an APDU communication channel, an Internet Protocol (or IP) communication channel, an HyperText Transfer Protocol (or HTTP) communication channel, and/or a Mass Storage communication channel.

The microprocessor 12 executes notably any application stored within the chip memories 14 that the USB card 10 supports.

The microprocessor 12 controls and communicates with all the components of the chip 110, such as the memories 14 to read them and possibly write into them.

The memories 14 can be constituted by one or several EEPROM (acronym for "Electrically Erasable Programmable Read-Only Memory"), one or several ROM (acronym for "Read Only Memory"), one or several Flash memories, as non-volatile memories 142, and/or any other memories of different types, like one or several RAM (acronym for "Random Access Memory"), as volatile memories 144.

According to the invention, the chip 110 of the USB card 10 is arranged to exchange with outside, notably a USB phone, through at least one USB communication channel, so as to interact with the outer device.

The proposed solution by using the USB device HID class for the USB card 10 allows to benefit from the master-slave relationship established between the USB phone and the USB card 10, as USB HID peripheral, notably when the USB card 10 plays the master role while the USB phone plays the slave role. The USB card 10 is therefore able to send to the phone at least one proactive command (i.e. that the USB card 10 initiates) that the phone is able to interpret and execute by performing one corresponding requested action(s).

The chip 110 may store a specific HID usage table. The HID usage table defines a meaning ("usage") of different reports that may be exchanged between the USB card 10 and its host device. More exactly, it is a format of different reports that are initially sent from the USB card 10, as USB device, to its host device.

The HID usage table basically describes usage Tags assigned to its used descriptors, in order to associate each of the reports with one or several corresponding actions. The usage assignment to descriptors and events within the scope of the invention may refer to proactive commands and events described within the ETSI TS 102 223 version 8.2.0. (2009-01), notably in paragraphs 6 and 6.4, and/or possible other additional proactive command(s).

The HID usage table enables the phone, as host device, to match specific data received from the chip 110 of the USB HID peripheral with its meaning and, therefore, with its intended usage.

The HID usage table includes at least one HID report. Each HID report conveys information corresponding to a proactive command that the USB card 10 supports.

The chip 110 may be adapted to communicate to the phone data relating to the specific HID usage table.

Once the phone knows the specific HID usage table (possibly after having received it from the USB card 10), the phone is thus able to interpret data, as at least one HID report, originating from the USB card 10, as USB HID peripheral.

The USB card 10 may send, through a USB communication channel, to the phone, one HID report, as a proactive command, further to an event occurring on any I/O interface 16 of the chip 110.

A USB communication channel may support a USB Interrupt (IN) pipe that enables the USB HID peripheral to send such an HID report(s) to the phone, as host device, at the USB HID peripheral initiative.

Such a triggering of the sending of the HID report avoids that the phone carries out a regular polling at a high level, so as to verify whether the USB card 10 has or not any proactive command at the phone's disposal.

Even when the USB communication channel does not support any USB Interrupt (IN) pipe, a low level polling mechanism may be performed on another USB communication pipe, such as the USB default pipe, namely the USB Control Pipe "0". Such a low level polling mechanism greatly reduces the overhead in comparison with a polling mechanism performed on an applicative layer, i.e. at a high level, like for example on an APDU applicative layer.

As soon as the phone has interpreted data as being a proactive command, the phone associates the proactive command with one or a plurality of associated action(s) to be carried out by the phone, as host device.

As action(s), it can be at least some action(s) specified within the ETSI TS 102 223, known as CAT (acronym for "Card Application Toolkit"), such as:

display a menu that a user may select through a phone man machine interface;
  request a user interaction through a phone man machine interface;
  send a message, like a Short Message Service (or SMS), to a mobile radio-communication network(s) to which the phone is connected; and/or
  request the phone to seek a proactive command that may have been provided by the USB card 10 and that the USB card 10 has to send to the phone.

As action(s), it can also be at least a part of the following one(s):

to inform the USB card 10 when a particular event(s) occur(s);
  to display at least one piece of information within a display screen incorporated into or linked to the host device itself;
  to send, through the host device and possibly a mobile radio-communication network(s), a message to another subscriber that may be identified within or thanks to the proactive command;
  to retrieve at least one file specified within or thanks to the proactive command and stored within the USB card 10 through a particular interface, such as a mass storage interface, that may be identified within or thanks to the proactive command;
  to send, through a particular interface, such as an Internet Protocol interface, that may be identified within or thanks to the proactive command, to the USB card 10, one request for executing one or several predetermined operations on a web server application supported by or that is to be launched from or through the USB card 10.

The action list that is specified just hereinabove is not intended to limit the count of actions that the USB card 10 is able to request to the phone, as host device.

As soon as the requested actions have been carried out by the phone, the phone may send back to the USB card 10 a response. The USB card 10 may have previously requested, within the proactive command, that the response be transmitted in return, through an identified USB communication channel or another available communication channel (or interface), such as an IP communication channel.

Thus, depending on an amount of data or a desired latency of a response, it is possible to use a most appropriate USB communication pipe, such as a USB Bulk transfer pipe, to avoid overloading the USB interrupt pipe or USB control pipe used for providing the low level proactive functionality or capability.

The major advantage of the invention USB card 10 is to offer a proactive capability in an independent manner of the phone, as host device, provided that the phone is able to recognize a USB device to which it is connected as a USB HID peripheral and to interpret any HID report as a corresponding proactive command that the phone knows, i.e. in an independent manner of a manufacturer of the phone.

Figure 2:
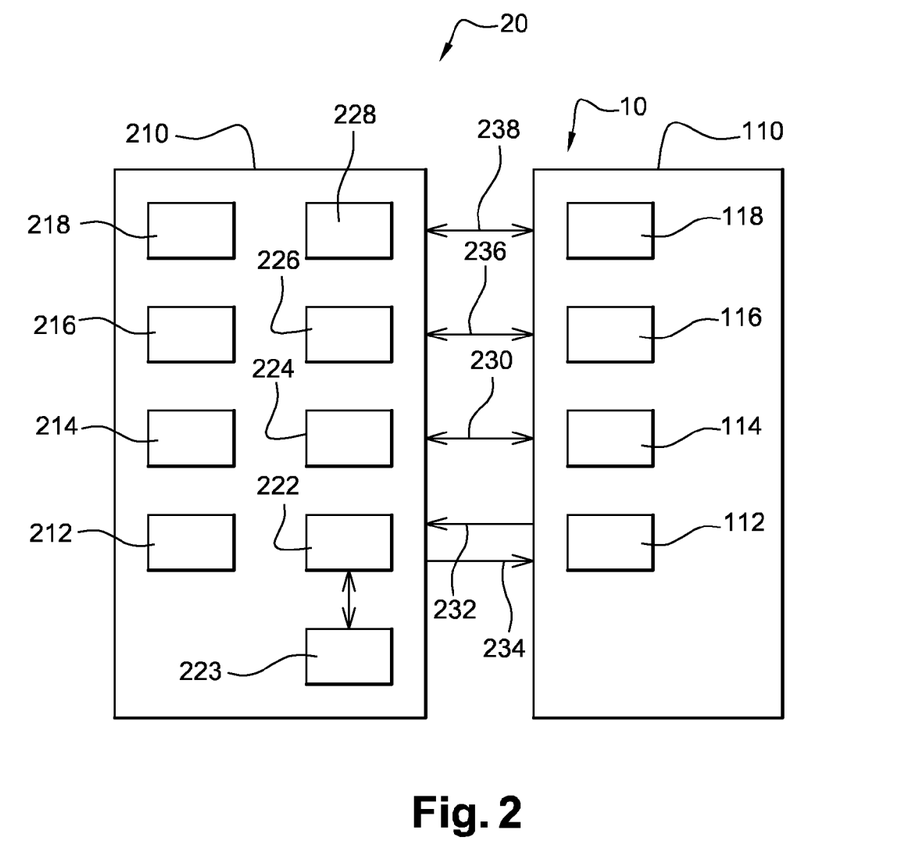
FIG. 2 represents a simplified diagram of one embodiment of a communication system comprising a mobile telephone, as host device, and the token of FIG. 1, the system being adapted to let the host device carry out some action(s) requested from the token and at its own initiative according to the invention.

As shown by FIG. 2, a communication system 20 includes the USB card 10 and a phone 210 that is coupled, through at least one USB communication channel, to the USB card 10.

The USB card 10 may be removable from the phone 210 in which the USB card 10 is inserted.

FIG. 2 schematically depicts, among others, different application types that benefit from the proactive capability of the USB card 10 that takes place at a low level, so as to interact with the phone 210.

The USB card 10 is hereunder assumed to present itself as a USB composite device, e.g. a USB card compliant with the ETSI TS 102 600, which additionally uses the HID class to support proactive services, such the ones defined by the ETSI TS 102 223 to its other supported class(es).

It is assumed that the USB card 10 preferably supports the CAT of the ETSI TS 102 223 version 8.2.0. (2009-01) that is herewith incorporated by reference notably for the proactive commands and events that may be used. However, other proactive command(s) and/or event(s) may be defined and added to the CAT proactive commands.

The phone 210 also comprises (not represented) at least one phone microprocessor, as data processing means, phone memories and at least one I/O interface.

The phone 210 has, as computing means, better performance than the one of the USB card 10.

To cooperate with the invention USB card 10, the phone 210 includes a USB HID driver 222 stored within the phone memories, in order to drive a data exchange with the USB card 10, as USB HID peripheral, as well as a HID usage table 223 stored within the phone memories for the proactive capability of the USB card 10.

The HID usage table 223 may have been provided by a remote server (not represented) that is administrated by a service operator, such as a mobile radio-communication operator or on its behalf.

The phone 210 supports a CAT proactive command manager 212 stored within the phone memories, so as to manage all the possible proactive commands that the phone 210 may receive from the USB card 10.

The phone 210 may support several applications stored within the phone memories, such as APDU based application(s) 214, Internet Protocol based application(s) 216, and/or Mass Storage Protocol based application(s) 218. These different applications based on different protocols communicate, at a low level layer, through different respective independent applicative interface drivers, such as a standard USB Smart Card Integrated Circuit Card Device (or ICCD) driver 224 (as specified within the ETSI TS 102 600), a standard Ethernet USB Communication Class for Ethernet Emulation Model (or EEM) Devices driver 226 (as specified within the ETSI TS 102 483), and/or a Mass Storage driver 228.

The USB card 10 communicates, over one or several USB communication channels, with the phone 210 to cooperate with it.

The USB communication functionality is based upon a low level polling mechanism on the USB bus at high frequency (i.e. every millisecond), over which different USB communication channels or "pipes" may be established depending on the intended traffic needs. Among the pipes, a USB Interrupt pipe from the USB HID peripheral to the host device, namely a USB Interrupt IN pipe 232 is used by a user interface device to inform the host device of user interactions, such as moving a computer mouse, or events. The standard USB class used to support such human interacting devices is the HID class. The HID class also supports the use of a USB Interrupt OUT pipe 234 from the host device to the USB HID peripheral.

The USB card 10, as a so-termed USB composite device, supports several independent applicative interfaces defined over USB, such as:

an APDU interface 114,
an Internet Protocol (or IP) interface 116, and
a Mass Storage (or MS) interface 118.

Each of these applicative interfaces may use at least one USB communication channel, in order to cooperate with a corresponding driver at the phone's side.

The APDU interface 114 may use a bi-directional USB default endpoint "0" 230, also termed one USB control pipe, to exchange with the USB Smart card ICCD driver 224 supported by the phone 210.

The Internet Protocol interface 116 may use a bi-directional USB bulk transfer pipe 236, to exchange with the USB Ethernet Emulation Model driver 226 supported by the phone 210.

Likewise, the Mass Storage interface 118 may use another bi-directional USB bulk transfer pipe 238, to exchange data with the USB Mass Storage driver 228 supported by the phone 210.

The USB card 10 is arranged to declare itself before the phone 210 as a USB composite device supporting the USB device class for HID among other USB device classes.

Alternately, according to another implementation, the USB card 10 is arranged to declare itself before the phone 210 as a USB Compound Device.

It shall be noted that, according to the invention, the USB HID device class is considered to act, as a proactive capability enabler, for other services offered by the USB peripheral (through some other USB device class or through other communication channel(s), such as a Contact-less interface). Thus, the USB HID device class may not represent a standalone functionality of the device as is normally the case for other HID devices.

Therefore, the interest of a support of the USB HID class on the USB card 10, as token, mainly arises from its association with other USB device class(es) or the presence of other physical communication channel(s), like an IP communication channel.

As known per se, a USB composite device and a USB compound device both support several USB device classes. A particular USB device class of a USB composite device is accessed from its host device through one dedicated address while one of the USB device classes of a USB compound device is accessed from its host device via one single address shared by all the USB device classes.

To declare as supporting the USB device class for HID, the USB card 10 is adapted to receive, from the phone 210, through one USB communication channel, such as the USB default endpoint "0" 230, a command for requesting the USB card 10 to specify the functions or services that the USB card 10 supports.

Once the USB card 10 has received and interpreted such a command, the USB card 10 is able to send back to the phone 210, through one USB communication channel, such as the USB default endpoint "0" 230, a response for indicating to the phone 210 that the USB card 10 supports a USB device class for HID.

The invention USB card 10 manages, at a low level layer, a proactive capability of the USB card 10, as USB HID peripheral, thanks to a manager 112 of the proactive capability, as means for managing a proactive session.

On the USB card's side, the manager 112 of the proactive capability of the USB card 10 is accessible from any kind of application supported by the USB card 10, such as an APDU application using the APDU interface 114, such as USIM or ISIM, or a Smart Card Web Server (or SCWS) application using the IP interface 116.

As known per se, the USB card 10 provides web server services to an application located either locally within the phone 210 or remotely, such as within a device included within or connected to the mobile radio-communication network(s) to which the phone 210 is connected.

Assuming that the SCWS application is being executed by the USB card 10 and needs to access proactive services, the USB card 10 is able, thanks to the manager 112 of the proactive capability, to access the CAT proactive commands (or the like).

More exactly, the manager 112 of the proactive capability receives, through the IP interface 116, from an applicative layer, such as the SCWS application that is running, an order for benefiting from a proactive command. The manager 112 of the proactive capability translates the order into a corresponding HID report relating to the proactive command. The corresponding HID report is then sent, through, for example, the USB Interrupt IN pipe 232, to the phone 210 (and more exactly through the USB HID driver 222).

The USB Interrupt IN pipe 232 with a HID default Idle rate may be set to Infinity.

The applicative layer may have triggered the need of calling proactive services due to the fact that the phone 210 has informed by sending, through an Interrupt Out pipe 234, to the USB card 10 a particular event, such as a call originating from a device included within the mobile radio-communication network (not represented) to which the phone 210 is connected.

The USB card 10 sends either directly one proactive command through the USB Interrupt IN pipe 232 or further to one event informed by the phone 210 through the USB Interrupt Out pipe 234.

Alternatively, the USB card 10 sends back, in response to a HID polling command, namely 'GET REPORT' originating from the phone 210, one proactive command through the USB Control pipe 230.

In such a context of the USB card 10 (as a USB composite or compound device supporting several USB device classes for different applications), the proactive services are implemented, once for all, at the low level. The proactive services are thus made efficiently available to all the interested device class(es) through the HID interface (instead of being provided or ported at the level of each applicative layer, as high level layer). There is thus no need to create another proactive framework at the applicative level for each USB device class supported by the USB card 10.

The USB card 10 allows flexibility by specifying on which USB device class, among the possible ones, the corresponding action(s) requested through the proactive command is to be executed by the phone 210.

The action(s) requested through the proactive command may take advantage of the other USB device class(es) supported by the USB card 10 and the phone 210, such as a particular web server application(s) or a particular mass storage file(s).

For example, a proactive command related to a call control may be used to set up connections by an application using the IP interface 116 implemented on top of the USB EEM class.

According to another example, a proactive command may be defined to instruct the phone 210 to carry out a specific action(s) on a particular web server application supported by the USB card 10, such as performing one synchronization of the web server content with the host's internal memory (e.g. for phonebook data), or sending a request for retrieving specific information referenced by the proactive command itself.

For example, a proactive command such as "SUBMIT MMS" (acronym for Multimedia Message Service) that requires heavy data transfer to send a message may indicate to retrieve the message from a file stored upon a USB Mass Storage memory space supported by the USB card 10.

According to another example, a proactive command for retrieving a file specified within the proactive command upon a USB Mass Storage memory space supported by the USB card 10 may be defined to display an idle screen video on the phone 210.

When the USB card 10 implements several USB device classes, it may be relevant to indicate to the phone 210, through which USB communication channel (or interface), as the best available suited, the phone 210 has to transmit a response to the received proactive command for a particular action(s) requested by the proactive command.

Even though the standard USB device class for HID is intended for another purpose, namely a peripheral device that interacts with a human, the USB card 10 advantageously uses the standard USB HID class. As a matter of fact, there is no need to modify the existing standard USB software stacks used between the phone 210 and the USB card 10.

Instead of using the USB Interrupt IN pipe 232, the USB card 10, as USB HID peripheral, may benefit from a HID polling mechanism.

The HID polling mechanism is carried out at a low level layer either by using the existing transport level polling using the existing hardware polling mechanism upon the USB Interrupt Out pipe 234 or by regularly sending a low level USB command upon the USB default pipe "0" 230. In this latter case, the low level layer polling mechanism significantly decreases the traffic overhead that is involved to provide the proactive capability, in comparison with a polling performed at an applicative level, as high level layer, such as using the CAT over an APDU interface.

Further to the receipt and the interpretation of the proactive command, thanks to the HID usage table 223 to which the CAT proactive commands manager 212 addresses, the phone 210 executes the received proactive command by carrying out the action(s) which the proactive command that is(are) associated with and indicated within the HID usage table 223.

The HID usage table 223 is to be specified so that each different type of HID report is associated with its intended usage. The HID usage table 223 may be either stored natively into the phone memories (by loading it during its manufacturing) or loaded from the USB card 10 or a remote server, as one device included within or connected to a mobile radio-communication network to which the phone 210 can connect.

Different implementations are possible.

If only a minimum of modifications with respect to the existing implementations within the ETSI TS 102 223 proactive commands are desired, then only one HID report type from the USB card 10 to the phone 210 is needed, so as to indicate on which supported USB device class an action is to be executed with a reference to the desired action. Such an HID report may be implemented by using an HID "short" item. The requested action takes place upon the specified USB communication channel or interface. For example, the HID report indicates the length of the standard ETSI TS 102 223 proactive command to be retrieved upon the USB ICCD interface by means of a "FETCH" command, i.e. a proactive command available on the USB card's side to be sought by the phone 210. The corresponding HID usage table 223 only needs to indicate that the defined HID report corresponds to a CAT proactive command with no further details.

Such an implementation allows to get rid of the HID polling mechanism by using the USB Interrupt IN pipe 232 with the existing CAT, avoiding thus to create a new software program.

Another implementation allows defining one generic type of ingoing HID report (i.e. from the USB card 10 to the phone 210) that directly contains a byte string (length of 256 bytes is sufficient), so that the phone 210 interprets it as Tag Length Value (or TLV) data object containing a proactive command (i.e. data identical to a proactive command to be retrieved by means of the "FETCH" command according to the ETSI TS 102 223).

A generic outgoing HID report (from the phone 210 to the USB card 10) may be defined to convey the response data (i.e. a format identical to the one transmitted within a "TERMINAL RESPONSE" command according to the ETSI TS 102 223).

An additional outgoing HID report may also be defined to convey an event(s) notably when only the USB default pipe "0" 230, as the USB control pipe 230 is available to transport the HID report. Such an additional HID report greatly reduces the transport protocol overhead in comparison with an implementation of the ETSI TS 102 223 proactive command over the USB smart card ICCD interface 224.

If a full migration to HID is desired, an ingoing HID report (i.e. from the USB card 10 to the phone 210) may be defined for each proactive command and may further indicate the supported USB device class upon which the phone 210 reports about the performed action(s).

For example, the report defined for the TS 102 223 proactive command may be an HID "collection" consisting of HID "Long" Items, in order to duplicate command parameters Comprehension TLV structure returned in response to "FETCH" commands as disclosed within the ETSI TS 102 223.

Figure 3:
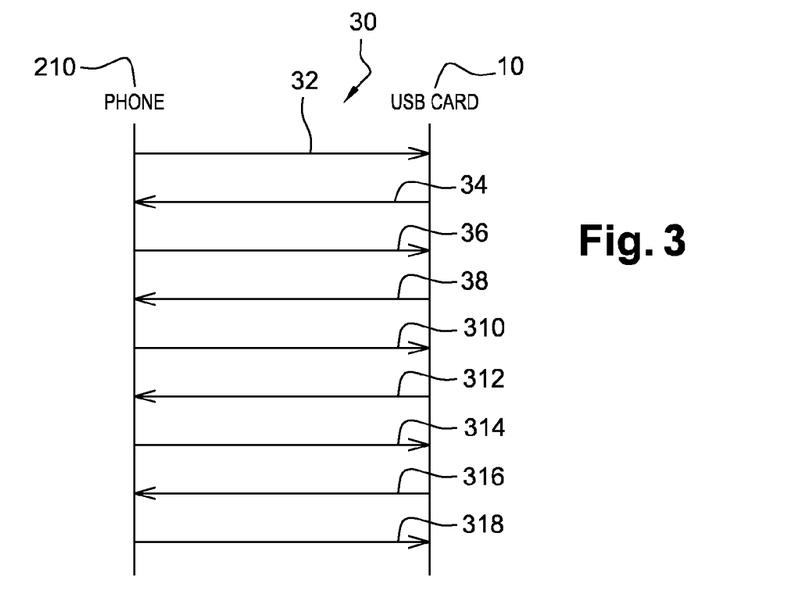
FIG. 3 illustrates three examples of a message flow between the host device and the token of the communication system of FIG. 2 while using notably the HID reports originating from the token to trigger actions executed by the host device.

Hereinbelow is described, in relation with FIG. 3, one example of a set 30 of messages exchanged between the USB card 10 and the phone 210.

Prior to a configuration phase, it is assumed that an initialization phase (not represented) relating to a USB functionality described within the USB 2.0 specification has successfully taken place. When the USB card 10, as USB device, is connected to the USB bus and powered, the USB card 10 indicates its presence to the phone 210. The phone 210 then acknowledges the attachment of the USB card 10 and assigns an address to the USB card 10. The phone 210 may also recognize the speed (for example Low Speed or Full Speed) at which the USB card 10 is capable to operate. A USB default communication channel becomes available and can be used by the phone 210 to exchange messages with the USB card 10.

Firstly, during a configuration phase, the phone 210 requests the USB card 10 to precisely enumerate capabilities and, in return, the USB card 10 announces as USB HID peripheral (possibly in conjunction with other USB device class(es) capabilities) before the phone 210. The configuration phase is compliant with the USB 2.0 specifications notably paragraph 9.2.3. "Configuration", Section 9.4 "Standard Device requests", Table 9-8 "Standard Device Descriptor" and Table 9-12 "Standard Interface Descriptor".

To announce as supporting the USB device class for HID, the phone 210 sends, through the USB default pipe "0" 230, to the USB card 10 a GET-DESCRIPTOR request 32, as first command, accompanied with a parameter specifying a descriptor type that the phone 210 wants the USB card 10 to return.

In reply, the USB card 10 sends back, through the USB default pipe "0" 230, to the phone 210 an HID-DESCRIPTOR response 34. The HID-DESCRIPTOR response 34 is returned according to a format specified within the USB 2.0 specifications and extended to various device class specifications, such as HID. The HID-DESCRIPTOR response 34 allows to declare the HID class specific features supported by the USB card 10, in order to know how the USB card 10 operates and how the phone 210 exchanges data. Moreover, the HID-DESCRIPTOR response 34 may propose several configurations offering different services to the phone 210, so that the phone 210 may select the configuration that the phone 210 desires. For example, the USB card 10 may present a configuration by which the USB card 10 supports not only the HID class but also the USB smart card class.

The phone 210 receives the HID-DESCRIPTOR response 34, interprets it and thus knows that the USB card 10 supports at least the HID class. The phone 210 may select the configuration among several ones proposed by the USB card 10.

The phone 210 may request from the USB card 10 further details about the supported HID class, for example, the supported report format(s).

The phone 210 decides about the device configuration for the USB card 10 the phone 210 wants to use. To inform about its decision, the phone 210 sends to the USB card 10 a SET-CONFIGURATION command 36. The USB card 10 thus knows which configuration comprising the HID class the USB card 10 has to activate.

Depending on configurations supported by the USB card 10, while referring to the HID 1.1 specifications paragraph 4, the support of the HID class by the USB card 10 is indicated by setting different configuration parameters, such as the bInterfaceClass, bInterfaceSubclass and bInterfaceProtocol fields within one of the Interface descriptor returned by the USB card 10 to 03h, 00h and 00h respectively. The value 03h is the assigned USB class code for HID devices, as can be seen at the internet site http://www.usb.org/developers/defined_class.

Once the phone 210 and the USB card 10 know that they both support the HID class, they may operate accordingly by exchanging data notably at an initiative of the USB card 10 while using HID reports. As HID reports, they relate to data packets formatted according to a HID report descriptor preferably provided by the USB card 10 to the phone 210. When the USB card 10 sends an HID report to the phone 210, the USB card 10 preferably uses the mono-directional USB Interrupt IN pipe 232. Conversely, i.e. when the phone 210 sends an HID report to the USB card 10, the phone 210 preferably uses the mono-directional USB Interrupt OUT pipe 234.

The USB card 10 runs at least one application program relying notably on services available only on the phone's side, such as communication services or user interface services. The fact that the USB card 10 presents itself as HID peripheral, before the phone 210, allows the USB card 10, that has no human interface, to request, on its own, services that may be provided by the phone 210. The HID class may be used, in particular, as a way to artificially revert the master-slave relationship normally implied between the phone 210 (supplying power to the USB bus and controlling a connected peripheral(s)) and the USB card 10, as HID peripheral (providing a service(s) to its host device).

Three examples of data exchange initiations originating from the USB card 10, as proactive commands, are hereinbelow described while referring between brackets, for their definition, to corresponding proactive commands specified within the ETSI TS 102 223 version 8.2.0. (2009-01) notably at paragraphs 6 and 6.4.

Thus, the USB card 10 plays the master role by sending to the phone 210 three different proactive commands. Each proactive command is individually encapsulated within a corresponding HID report. The exchange of the performed proactive commands and events uses HID reports within the USB HID class.

Such an exchange follows the pattern for exchanging proactive commands and events referring to the ETSI TS 102 223 over the APDU interface 114 of the USB card 10.

The USB card 10 sends to the phone 210 an HID IN-Report ("Set-up menu") 38, as first proactive command for adding some elements relating to services that the USB card 10 supports. When the phone 210 has received the HID IN-Report ("Set-up menu") 38, the phone 210 displays the USB card' services through its display screen or a display screen to which the phone 210 is connected and controls. The phone 210 may have sent back to the USB card 10 an HID Out-Report ("Terminal Response") (not represented), for example to indicate that the phone 210 acknowledges receipt of the HID IN-Report, by which the phone 210 informs that it takes the USB card's services into account.

Once a phone user knows the USB card's services, the phone user selects by means of a man machine interface (like a phone display screen, and/or a phone keyboard) connected to or comprised within the phone 210, an application supported by the USB card 10.

The phone 210 sends to the USB card 10 an HID OUT-Report ("Menu selection") 310 that informs the USB card 10 about the menu item, i.e. a corresponding USB card's service, that the phone user has just selected, such as a "banking services" menu.

To continue with the offer of such USB card's services, the USB card 10 directly sends to the phone 210, an HID IN-Report ("Select Item") 312, as second proactive command for requesting the phone 210 to display, for example, on the phone's display screen, a list of items supplied as part of actions relating to the proactive command. Then, the phone user may select an item among the displayed ones, for example, "consult checking account", as first option, "saving account", as second option, or "transfer money", as third option.

Only one data exchange between the phone 210 and the USB card 10, namely one transmission from the phone 210 to the USB card 10 and another transmission from the USB card 10 to the phone 210, is required. More exactly, the HID OUT-Report ("menu selection") 310 and the following HID IN-Report ("select item") 312 constitute the sole data exchange. As a matter of fact, as known per se with the existing APDU proactive capability while referring to the ETSI TS 102 223, at least one additional data exchange is required. More exactly, the additional data exchange consists in informing the phone 210 about the so-termed USB card "status" (notably with the command constituted by a status word "SW=91XX" or "SW=90 00") and requesting from the USB card 10 the proactive command that is waiting on the USB card's side to be sought from the phone 210 (notably with the command constituted by "FETCH").

Once the phone user has selected one item among the ones displayed, for example the first option among the three proposed ones, then the phone 210 sends to the USB card 10 an HID OUT-Report ("Terminal Response") 314, as response to the second proactive command, with the selected item.

Then, to pursue with the selected first option, the USB card 10 directly sends to the phone 210 an HID IN-Report ("Get-Inkey") 316, as third proactive command for requesting the phone 210 to display to the phone user a text allowing her or him to press a key for selecting an option among several ones. For example, "View all transactions?" by proposing to depress key "1", as first option, and "view balance?" by proposing to depress key "2", as second option, are both displayed at a time.

Contrary to the known prior art solution, only one data exchange between the phone 210 and the USB card 10, namely one transmission from the phone 210 to the USB card 10 and another transmission from the USB card 10 to the phone 210, is required. More exactly, the HID OUT-Report ("Terminal Response") 314 and the following HID IN-Report ("Get Inkey") 316 constitute the sole data exchange.

When the phone user has chosen one option by depressing, for example, key "1", the phone 210 sends to the USB card 10 an HID OUT-Report ("Terminal Response") 318, as response to the third proactive command, accompanied with the indication of the value of the depressed key.

Figure 4:
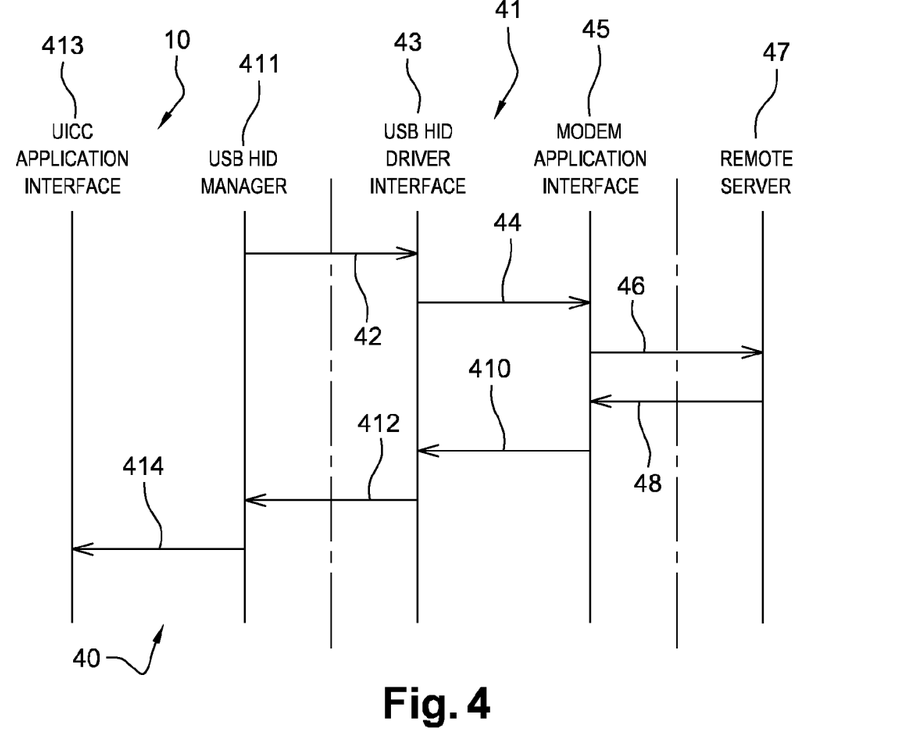
FIG. 4 illustrates another example of a message flow notably between the token of FIG. 1 and a mobile USB On-The-Go phone, as host device, so that the token benefits from a host device service under the token control while involving an external entity.

FIG. 4 depicts one example of a message flow 40 that involves the USB card 10, a mobile USB On-The-Go device 41, and an external entity.

It is assumed that the mobile USB On-The-Go device 41, like a USB On-The-Go smart phone, provides a modem control functionality, so as to access a mobile radio-communication network, such as a third Generation (or 3G) or a fourth Generation (or 4G) network. The mobile USB On-The-Go device 41 has a USB HID driver interface 43 and a modem application interface 45.

Moreover, the mobile USB On-The-Go device 41 provides a data traffic control functionality, so as to exchange data with a remote entity at a high data rate, i.e. greater than 100 kbits/s. The mobile USB On-The-Go device 41 has a data traffic application interface (not represented).

It is further assumed that the USB card 10 is connected to the mobile USB On-The-Go device 41, as host device. The USB card 10 has presented itself as a USB HID peripheral. Moreover, the mobile USB On-The-Go device 41 and the USB card 10 have already exchanged the corresponding appropriate configuration messages.

Thus, the mobile USB On-The-Go device 41 knows that the USB card 10 supports the USB device class for HID and how to exchange data with the USB card 10 while using HID reports. The HID reports are included within a HID usage table that, preferentially, the USB card 10 has provided to the mobile USB On-The-Go device 41. The mobile USB On-The-Go device 41 stores the HID usage table.

The herein below example is described so that the USB card 10, as USB HID peripheral, exploits the modem capability of the mobile USB On-The-Go device 41, in order to access a remote server 47, as external entity.

Naturally, another example(s) may have been explicited so that the USB card 10 exploits a functionality(ies) of the mobile USB On-The-Go device 41, like a display screen control functionality (for example to address an external video monitor), a keyboard control functionality (for example to address an external keyboard), and/or a functionality for launching an add-on application that is to be run by the mobile USB On-The-Go device 41.

The USB card 10 uses the USB device class for HID to communicate with the mobile USB On-The-Go device 41, to route at least one proactive command, such as a command for requesting the mobile USB On-The-Go device 41 to provide the USB card 10 with a modem service, like an AT (acronym for attention) command.

On a side of the USB card 10, there are two application interfaces, namely a proactive capability manager interface 411 and an UICC application interface 413.

Firstly, the proactive capability manager interface 411 sends a HID report 42 comprising the AT command, such as HID Report (Modem, "ATDT 01 23 45 67 89"), through, for example, a USB Interrupt In pipe, to the mobile USB On-The-Go device 41, and, more exactly, the USB HID driver interface 43. The HID report 42 encapsulates the AT command, as proactive command, to be executed at the mobile USB On-The-Go device 41.

Since the mobile USB On-The-Go device 41 knows the proactive command by retrieving within the stored HID usage table an action(s) associated with the concerned HID report, the mobile USB On-The-Go device 41 is thus able to interpret and address it to a corresponding internal application interface.

A first HID report request to be transferred to the modem control application, as host device service offered to the USB card 10, may consist of an HID "long" item that encapsulates the AT command sent by the USB card 10, as ASCII string.

Likewise, a first HID report response corresponding to the first HID report request addressing the modem control application may consist of an HID "long" item that encapsulates the response relating to a result of the AT command processed by the modem control application run by the host device 41.

The USB HID driver interface 43 extracts and transfers the encapsulated AT command 44, namely "ATDT 01 23 45 67 89", through the modem application interface 45, to the addressed modem control application.

The modem control application installed and run on the host device 41 executes the AT command, as modem control command, by dialing the phone number "01 23 45 67 89".

Once the phone number is dialed, the modem application interface 45 of the host device 41 sends a calling message 46 to a remote server 47, so as to set up a call initiated, through the host device 41, by the USB card 10.

As soon as the remote server 47 receives the calling message 46 and accepts the call, the remote server 47 sends back to the host device 41, and, more exactly, the modem application interface 45, a message 48 for informing that the requested call set-up has been successfully completed, like "OK".

Then, the modem application interface 45 transfers to the USB HID driver interface 43 a message 410 for informing this latter that the requested call set-up has been successfully completed, like "OK".

Once the USB HID driver has been informed, the USB HID driver generates a second HID report to be sent to the USB card 10 by encapsulating within the second HID report the received message for informing this latter that the requested call set-up has been successfully completed, like "OK".

As soon as the USB HID driver has generated the second HID report, the USB HID driver interface 43 sends, through, for example, a USB Interrupt Out pipe, the thus generated second HID report 412, as event, to the USB card 10 and, more precisely, the proactive capability manager interface 411.

On receipt of the second HID report, as event, the proactive capability manager interface 411 sends within the USB card 10 to the UICC application interface 413 a message 414 for informing it that the requested call set-up has been successfully completed, like "OK".

The receipt of such an information message 414 is processed by the UICC application.

The UICC application may then exchange an HTTP request(s) and response(s) with the thus connected remote server 47 by using, for example, another USB interface, such as Ethernet USB communication class for EEM device driver (not represented). The use of the USB EEM interface is adapted for exchanging HTTP data with the remote server 47 in a transparent manner with respect to the host device 41.

The UICC application then generates an HTTP request for downloading from the connected remote server 47 a particular data file, like, for example, an image file, such as data relating to a wall paper, i.e. an image to be stored within the USB card 10 and displayed at the phone display screen.

The request for downloading a selected data file is, for example, "get file id" while identifying the file to be downloaded with a corresponding identifier "id".

The UICC application interface 413 sends within the USB card 10 to the USB EEM interface a message (not represented) for transferring to the remote server 47 the HTTP request for downloading a selected data file.

The USB EEM interface transmits the HTTP request for downloading the selected data file to a data traffic application interface (not represented) within the host device 41.

The data traffic application has to interface with the remote server 47, as intermediary between the USB card 10 and the remote server 47. The data traffic application interface of the host device 41 allows the UICC application to exchange HTTP request(s) and response(s) with the remote server 47, in a transparent manner with respect to the host device 41. The host device 41 just routes HTTP data from the USB card 10 to the remote server 47 or conversely, namely from the remote server 47 to the USB card 10.

For example, the data relating to the selected data file to be downloaded from the remote server 47 has to be transferred through the host device 41 to the USB card 10 by using a USB bulk transfer pipe. The USB bulk transfer pipe is thus used from the host device 41 to the USB card 10 to transfer the HTTP response to the HTTP command "get file id".

Then, the remote server 47 processes the received HTTP command and sends back to the data traffic application interface the requested data file (not represented).

The data traffic application interface transfers, through the USB bulk transfer pipe, to the USB EEM interface the requested data file (not represented).

Then, the USB EEM interface sends to the UICC application interface 413 the requested data file (not represented).

The proposed solution allows the USB card 10 to benefit from an existing capability or service at the host device side, like the modem control functionality, at a low cost, since the host device 41 re-routes a request initiated by the USB card 10 while using the existing USB HID driver at the host device side and a specific HID usage table for each service.

The invention claimed is:

1. A Universal Serial Bus (USB) token, acting as a slave, for communicating with a host device, acting as a master, the USB token comprising means for communicating through at least one USB communication channel, the USB token supporting a USB device class for Human Interface Device (HID),
wherein the USB token is adapted to:
send, on its own, through at least one USB communication channel, data relating to an HID report, as one proactive command originating from the USB token, acting as the master, the proactive command requesting the host device, acting as the slave, to carry out at least one action.

2. The USB token according to claim 1, wherein the USB token is further adapted to receive, through at least one USB communication channel, a response to the proactive command.

3. The USB token according to claim 2, wherein the USB token is able to send, through at least one USB communication channel, data relating to a specific HID usage table in which the host device has to:
interpret data, as at least one HID report and as one proactive command originating from the USB token,
associate the proactive command with at least one corresponding action to be carried out by the host device, and
send to the USB token a response depending on the at least one corresponding action carried out by the host device.

4. The USB token according to claim 3, wherein the at least one action belongs to a group comprising:
an action for displaying at least one piece of information within a display screen controlled by the host device;
an action for requesting a user interaction through a host device man machine interface;
an action for requesting the host device to retrieve a proactive command originating from the USB token;
an action for sending a message, through the host device, to another external entity;
an action for retrieving a file specified within the proactive command and stored within the USB token through a particular interface, such as a mass storage interface;
an action for sending, through a particular interface, such as an Internet Protocol interface, to the USB token a request for executing at least one operation on a web server application supported by or that is to be launched from or through the USB token.

5. The USB token according to claim 1, wherein the USB token is able to
receive, from the host device, data relating to at least one event through at least one USB communication channel.

6. The USB token according to claim 1, wherein the at least one USB communication channel comprises:
a USB default pipe '0';
a USB control pipe;
a USB Interrupt IN pipe;
a USB Interrupt OUT pipe;
at least one USB bulk transfer pipe.

7. The USB token according to claim 1, wherein the USB token comprises means for communicating, through at least another communication channel, the other communication channel comprising, as one or several interfaces,
an Application Protocol Data Unit;
an Internet Protocol;
a HyperText Transfer Protocol; and/or
a Mass Storage Protocol.

8. The USB token according to claim 1, wherein the USB token comprises means for securely storing a service subscriber key, the service subscriber key being used to authenticate a subscriber for benefiting from a mobile radio-communication service.

9. The USB token according to claim 1, wherein the USB token is able to send, as an HID report, a proactive command that requests that a response is transmitted in return, through an identified communication channel, such as either a USB bulk transfer pipe or an Internet Protocol communication channel.

10. The USB token according to claim 1, wherein the data relating to an HID report originating from the USB token encapsulates a proactive command originating from the USB token and/or data relating to an HID report and received by the USB token encapsulates the response to the proactive command.

11. A method for communicating between a host device, acting as a master, and a Universal Serial Bus (USB) token, acting as a slave, the USB token and the host device comprising means for communicating, through at least one USB communication channel, with the host device and the USB token respectively, the USB token supporting a USB device class for Human Interface Device (HID),
wherein the USB token sends, on its own, through at least one USB communication channel, to the host device data relating to an HID report, as one proactive command originating from the token, acting as the master, the proactive command requesting the host device, acting as the slave, to carry out at least one action.

12. The method according to claim 11, wherein the host device sends back, through at least one USB communication channel, to the USB token, a response to the proactive command.

* * * * *